United States Patent [19]

Ray

[11] Patent Number: 4,717,692

[45] Date of Patent: Jan. 5, 1988

[54] COMPOSITES COMPRISING ONE OR MORE INTERWOVEN MATRIX COMPOSITIONS EACH CONTAINING A REFRACTORY HARD METAL AND METHOD OF FORMING SAME

[75] Inventor: Siba P. Ray, Plum, Pa.

[73] Assignee: Aluminum Company of America, Pittsburgh, Pa.

[21] Appl. No.: 789,438

[22] Filed: Oct. 21, 1985

Related U.S. Application Data

[63] Continuation-in-part of Ser. No. 604,913, Apr. 27, 1984, which is a continuation-in-part of Ser. No. 423,673, Sep. 27, 1982, Pat. No. 4,454,015.

[51] Int. Cl.$^4$ .................... C04B 35/10; C04B 35/56; C04B 35/58
[52] U.S. Cl. ........................ 501/87; 501/92; 501/96; 501/97
[58] Field of Search ................. 501/87, 92, 96, 97

[56] References Cited

U.S. PATENT DOCUMENTS

| | | | |
|---|---|---|---|
| 3,016,288 | 1/1962 | Andrieux et al. | 23/204 |
| 3,143,413 | 8/1964 | Krapf | 501/87 |
| 3,726,643 | 4/1973 | Merzhanov et al. | 423/409 |
| 3,856,650 | 12/1974 | Kugler et al. | 204/243 R |
| 3,997,640 | 12/1976 | Walton, Jr. | 264/82 |
| 4,181,584 | 1/1980 | Steiger et al. | 204/67 |
| 4,224,128 | 9/1980 | Walton | 204/243 R |
| 4,308,113 | 12/1981 | Das | 204/67 |
| 4,308,114 | 12/1981 | Das et al. | 204/67 |
| 4,338,177 | 7/1982 | Withers et al. | 204/243 R |
| 4,349,427 | 9/1982 | Goodnow et al. | 204/243 R |
| 4,353,885 | 10/1982 | Hoekje | 423/289 |
| 4,376,029 | 3/1983 | Joo' et al. | 204/294 |

OTHER PUBLICATIONS

"Cermets from Thermite Reactions", J. D. Walton, Jr. et al, *Journal of the American Ceramic Society*, vol. 42, No. 1, Jan. 1959, pp. 40–49.

"Dependence of the Composition of the Products and the Combustion Rate in Metal–Boron Systems on the Ratio of the Reagents", N. P. Novikov et al, Plenum Publishing Co., 1975.

"Evaluating the Thermal Shock Resistance of Ceramics in a Radiant Thermal Energy Environment", J. D. Walton et al, *Science of Ceramics*, vol. 7, pp. 219–236, 1973.

"Gasless Combustion of Mixtures of Powdered Transition Metals with Boron", I. P. Borovinskaya et al, Plenum Publishing Co., 1975.

"Inert Cathodes and Anodes for Aluminum Electrolysis", K. Billehaug et al, Aluminum–Verlag GmbH, Konigsallee 30, 4000 Dusseldorf 1, Federal Republic of Germany, 1981, p. 23.

"Preparation of Composite Coatings Using Exothermic Reactions of Nonmetallic Refractory Compounds with Transition Refractory Metal", A. L. Borisova et al, *Zashchitnye, Pokrytiya na Metallokh*, Kiev, 1982, No. 16, pp. 51–54.

List continued on next page.

*Primary Examiner*—Mark L. Bell
*Attorney, Agent, or Firm*—Andrew Alexander; John P. Taylor

[57] ABSTRACT

A composite is disclosed which comprises one or more interwoven matrix compositions, each containing a refractory hard metal; and from 0 to 80 wt. % of at least one previously formed refractory hard metal. In one embodiment, the composite may comprise two interwoven matrix compositions which were formed by mixing the reactants together prior to forming the interwoven matrix compositions whereby the exothermic heat of react may be controlled by selection of proper ratios of reactants. In another embodiments, previously formed refractory hard metals or previously formed interwoven matrix compositions may be used in the formation of the composite to control the exothermic heat liberated during formation of the interwoven matrix composition or for other purposes such as densification of the composite.

14 Claims, 1 Drawing Figure

OTHER PUBLICATIONS

"Preparation of Tantalum Carbides by Self-Propagating High-Temperature Synthesis (SHS), Institute of Chemical Physics, Chernogolovka Branch, No. 4, Apr. 1979, pp. 14–17.

"Production of Refractory Metals by Aluminothermic Reduction of Their Oxides", T. K. Mikherjee et al, *High Temperature Materials Proc. of the Symposium on Materials Science Research, 3rd*, 1972, pp. 221–234.

"Reaction Sintered Silicon Nitride for High Temperature Radome Applications", J. D. Walton, Jr., *Ceramic Bulletin*, vol. 53, No. 3, 1974, pp. 255–258.

"Self-Propagated High-Temperature Synthesis of Refractory Inorganic Compounds", A. G. Merzhanov et al, Consultants Bureau, 1972.

"Titanium Carbide Produced by Self-Propagating High-Temperature Synthesis—Valuable Abrasive Material", A. G. Merzhanov et al, Branch Institute of Chemical Physics, Academy of Sciences of the USSR, Special Design and Technology Dept., Institute of Materials Science, Academy of Sciences of the Ukrainian SSR., Trans. Poroshkovaya Met., No. 10(226), Oct. 1981, pp. 50–55.

"Advanced Materials Technology Project, Semiannual Technical Report", W. L. Frankhouser et al, System Planning Corporation for Defense Advanced Research Projects Agency, 1400 Wilson Boulevard, Arlington, VA 22209, Jun.–Nov. 1984, pp. 63–64.

"Exothermic Process Yields Refractory Nitride Materials", J. Birch Holt, *Industrial Research & Development*, Apr. 1983, pp. 88–91.

"High Pressure Self-Combustion Sintering of Silicon Carbide", Osamu Yamada et al, *Ceramic Bulletin*, vol. 64, No. 2, 1985, pp. 319–321.

"Displacement Reactions in the Solid State", Robert A. Rapp et al, *Metallurgical Transactions*, vol. 4, May 1973, pp. 1283–1292.

COMPOSITES COMPRISING ONE OR MORE INTERWOVEN MATRIX COMPOSITIONS EACH CONTAINING A REFRACTORY HARD METAL AND METHOD OF FORMING SAME

CROSS-REFERENCE TO RELATED APPLICATIONS

This application is a continuation-in-part of application Ser. No. 604,913 filed Apr. 27, 1984, which is a continuation-in-part of application Ser. No. 423,673, filed Sept. 27, 1982, and now issued as U.S. Pat. No. 4,454,015 on June 12, 1984.

BACKGROUND OF THE INVENTION

1. Field of the Invention

This invention relates to composites comprising one or more interwoven matrix compositions each containing a refractory hard metal. More particularly, this invention relates to composites comprising one or more interwoven matrix compositions comprising a refractory hard metal and a metal compound, and optional additional materials; and methods of forming such composites.

2. Description of the Prior Art

Refractory hard metals, such as $TiB_2$ or $ZrB_2$ are useful in applications where a material is needed possessing chemical inertness and/or mechanical strength, particularly at elevated temperatures. Such uses include dies for drawing, forming, or extruding; adiabatic engine components; abrasive disks or wheels; armor; gun barrels; structural components; tool bits; or as electrodes, e.g., a cathode, in an electrolytic reduction cell for the production of metal, such as aluminum.

When aluminum is produced in a Hall cell, for example, a certain amount of carbon is consumed from the electrodes per pound of aluminum produced. In Hall cells, often the cathode is fabricated from carbon or graphite, and in a typical Hall cell, the cathode is covered with a layer of aluminum. The layer of aluminum is maintained on the cathode for several reasons. First, aluminum reacts with the carbon cathode to a certain extent to form a thin layer of aluminum carbide on the cathode. The aluminum carbide layer, upon exposure to the bath, e.g., cryolite, dissolves. The exposure can occur as a result of magnetic currents in the cell moving the aluminum layer leaving the aluminum carbide exposed to the bath. Thus, to minimize replacement of the carbon cathode, sufficient aluminum is permitted to remain on the cathode to prevent such wear. In addition, because of the molten metal movement as a result of the magnetic currents, the anode-cathode distance in the cell cannot be minimized since such can result in short-circuiting of the cell. Thus, it can be seen that normally such a cell is operated at less than its optimum efficiency because a larger anode-cathode distance has to be used.

In the prior art, many attempts have been made to overcome this problem of having an excessive anode-cathode distance. For example, it has been recognized that when $TiB_2$ is used as a cathode surface, aluminum may be drained from the cathode surface without attack by the bath on the cathode. This, in turn, permits much closer anode-cathode distance without fear of short circuiting. However, the use of $TiB_2$ having the high level of purity required in such an application has proved to be very expensive. If inferior grades are used, this results in cracking of the $TiB_2$ and the attendant problems therewith. Of course, it will be recognized that one of the advantages of the use of refractory hard metals, such as titanium diboride, as a cathode surface resides in the fact that the $TiB_2$ surface is readily wettable by liquid metal, e.g., liquid aluminum. This result permits the cathode surface to be drained of the liquid metal and eliminates the electromagnetic problems encountered with a deeper or thicker aluminum pool. This, in turn, permits the use of a smaller anode-cathode distance with a distinct advantage in power efficiency.

However, as noted earlier, special controls often are used to preclude failures in the use of refractory hard metals, e.g., $TiB_2$, in these environments, such as, for example, set forth in U.S. Pat. Nos. 4,308,113 and 4,308,114. Also, U.S. Pat. No. 4,376,029 illustrates another attempt at using $TiB_2$ as a cathode by using a $TiB_2$-carbon mixture. One benefit disclosed for this mixture is the fact that a cheaper grade of $TiB_2$ may be used thereby lowering the overall cost of the cathode.

The interest in the use of $TiB_2$ as an electrode or electrode surface, for an electrolytic cell generated great interest in ways to economically produce such product in a form that could be used as a cathode. For example, U.S. Pat. No. 4,353,885 disclosed forming $TiB_2$ by vapor phase reaction. Additionally, U.S. Pat. No. 3,016,288 discloses an aluminothermic process of making boron compounds and alloys.

Yet, in spite of all this work, the use of $TiB_2$ cathodes in electrolytic cells finds extremely limited use. One factor which limits its use is the high cost. Thus, in order to obtain the benefits of such a material, it can be seen that there is a great need for a process which would provide $TiB_2$ or a material having properties similar to $TiB_2$ at an economically feasible cost.

In my parent U.S. patent application Ser. No. 604,913, there is disclosed a novel composition in which a refractory hard metal, such as $TiB_2$, is formed in an interwoven matrix with a metal compound by a displacement reaction. This invention relates to composites which include one or more of such interwoven matrix compositions and the method of making such composites.

SUMMARY OF THE INVENTION

It is, therefore, an object of the present invention to provide a composite containing one or more interwoven matrix compositions comprising a refractory hard metal and a metal compound, and 0–80 wt. % additives depending upon whether more than one interwoven matrix is used.

It is another object of the present invention to provide a composite containing one or more interwoven matrix compositions comprising a refractory hard metal and a metal compound suitable for use as an electrode in an electrolytic cell for the production of a metal from a metal oxide or other compound dissolved in a molten solvent bath.

It is yet another object of the present invention to provide a composite containing one or more interwoven matrix compositions comprising a refractory hard metal and a metal compound suitable for use as a cathode in an electrolytic cell for the production of aluminum from an aluminum containing material dissolved in a molten solvent bath.

It is a further object of the present invention to provide an improved method for making such composites by a displacement reaction wherein the generation of exothermic heat is controlled.

It is yet a further object of the present invention to provide an improved method for making such composites using the exothermic heat generated by a displacement reaction to fuse together the components comprising the composite.

In accordance with these objects, there is provided a composite containing one or more compositions comprising an interwoven matrix mixture of a refractory hard metal and a metal compound; and from 0 to 80 wt. % of an additional material.

BRIEF DESCRIPTION OF THE DRAWING

The sole FIGURE is a flowsheet illustrating the invention.

DETAILED DESCRIPTION OF THE INVENTION

Figure 1:
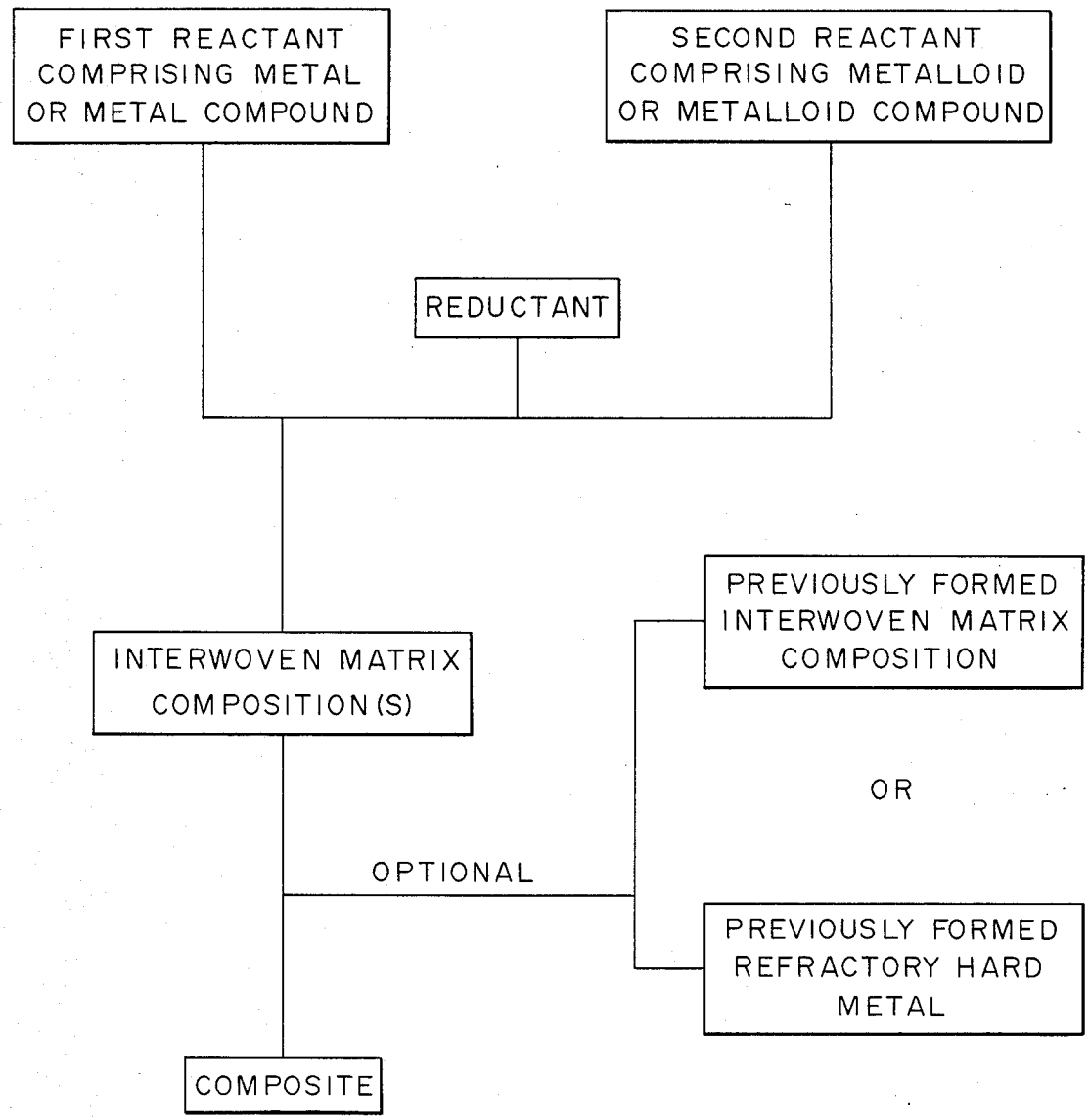

The invention comprises a novel composite containing one or more compositions comprising an interwoven matrix mixture of a refractory hard metal and a metal compound; and from 0 to 80 wt. % of an additional material depending upon whether more than one of the interwoven matrix compositions are utilized. The novel composite may be used for making dies used in drawing, forming, or extruding; adiabatic engine components; abrasive disks or wheels; armor; gun barrels; structural components; tool bits; or electrodes, e.g., a cathode, for use in an electrolytic reduction cell for the production of metal, such as aluminum. The invention further provides a method for making such composites.

The interwoven matrix compositions suitable for use in making the composite of the invention may be formed by reacting together a first reactant and a second reactant in the presence of a third reactant to provide a reaction wherein the reactants combine to form an interwoven matrix of a conductive material and an insulating material. In a preferred embodiment, the first reactant is a metal or a metal compound; the second reactant is a metal or a metal compound; and the third reactant is a material capable of being oxidized.

In a particularly preferred embodiment, the first reactant is a metal or a metal compound; the second reactant is a metalloid or a compound formed from a metalloid; and the third reactant is a reductant such that the reactants form an interwoven matrix of a refractory hard metal and a metal compound. The term "metalloid" is herein defined to include boron, nitrogen, carbon, silicon, and sulfur.

The first reactant is preferably selected from the class consisting of a metal; and oxides, carbides, nitrides, and silicides of metals. The second reactant is typified by silicon, boron, carbon, nitrogen, and the like or their compounds, e.g., oxides of silicon and boron and nitrides of sodium and potassium. The third reactant is preferably selected from Al, Mg, Ca, Ba, and the like.

In accordance with a preferred embodiment of the invention, the metal compound, e.g., metal oxide, resulting from the reaction is dispersed throughout the refractory hard metal thereby forming an interwoven matrix with the refractory hard metal resulting in a composition having a high level of conductivity.

The metals or metal compound reactants useful in the invention include those metals and metal compounds which react to form or provide a refractory hard metal dispersed through the reaction product with other compounds resulting from the reaction. In a particularly preferred embodiment of the invention in which a titanium diboride or zirconium diboride refractory hard metal is interwoven with aluminum oxide, the first reactant may comprise metallic titanium or zirconium, TiO, $TiO_2$, or $ZrO_2$; the second reactant may be boron oxide; and the third reactant may be metallic aluminum. Some of the possible reactions for this embodiment are illustrated as follows:

$$Ti + B_2O_3 + 2Al \rightarrow TiB_2 + Al_2O_3$$

$$TiO + B_2O_3 + 8/3Al \rightarrow TiB_2 + 4/3Al_2O_3$$

$$TiO_2 + B_2O_3 + 10/3Al \rightarrow TiB_2 + 5/3Al_2O_3$$

$$Zr + B_2O_3 + 2Al \rightarrow ZrB_2 + Al_2O_3$$

$$ZrO_2 + B_2O_3 + 10/3Al \rightarrow ZrB_2 + 5/3Al_2O_3$$

While such reactions are illustrated in stoichiometrically balanced equations which provide stoichiometrically balanced compounds, it will be understood that the use of non-stoichiometric compounds are contemplated within the purview of the invention. Further, the ratio of $TiB_2$ or $ZrB_2$ to $Al_2O_3$ in the interwoven matrix product can be varied, as will be noted herein, and such is also contemplated within the invention.

The term "refractory hard metal", as used herein, is intended to define compounds, such as metal nitrides, borides, carbides, silicides, sulfides, or mixtures thereof formed by reacting a metalloid, or a metalloid compound with a refractory metal, or a refractory metal compound, such as, for example, titanium, zirconium, hafnium, chromium, titanium oxide, or zirconium oxide.

The initial reactants, used to form the interwoven matrix composition utilized in the invention, should comprise 15 to 48 mol. % of metals or metal oxides, e.g., titanium or zirconium, oxides of titanium or zirconium, or alumina. In a preferred embodiment, the reactants can comprise 15 to 25 mol. % oxides of titanium or zirconium, 18 to 25 mol. % $B_2O_3$, and 50 to 70 mol. % Al. The reactants can be initially blended by mixing powders of the reactant and reductants and compacting them to pressures in the range of 5,000 to 40,000 psi. The initial reactants may also be formed into the desired shape, e.g., an electrode for a Hall cell by using isostatic pressing techniques well known to those skilled in the art.

The displacement reaction to form the interwoven matrix may be locally initiated by exposing a selected portion, such as an end of the compact, to a temperature sufficient to initiate the exothermic reaction. For example, in my copending application Ser. No. 789,435, entitled "Method of Forming a Substantially Interwoven Matrix Containing a Refractory Hard Metal and a Metal Compound", filed on even date with this application and assigned to the assignee of this invention, cross-reference to which is hereby made, (hereinafter referred to as my copending "local initiation" application) I have described and claimed methods for locally initiating an exothermic displacement reaction wherein the exothermic heat generated is then used to sustain the reaction through the remainder of the material. The use of such a method has distinct advantages such as conservation of heat energy used in producing such compositions as well as more rapid cool down when the heat is mainly internally generated.

As described in my aforementioned copending "local initiation" patent application, the heat to locally initiate the reaction may, for example, be supplied by a local resistance heater, by directing a source of heated gas or hot air at the formed object, or by using an inductive coil. Additional heat, of course, supplied to the entire body, may be used to supplement the locally generated exothermic heat, if necessary. This may be particularly important if the particular reactants do not generate sufficient exothermic heat to sustain the displacement reaction.

Preferably, however, the reactants used to form the interwoven matrix composition are chosen to avoid the need for such supplemental heat since by relying solely on exothermic heat, the entire process is speeded up since the time for residual cooling of a large furnace containing the entire formed object is eliminated.

The reactants may be hot pressed to form a shaped object comprising the composite of the invention while locally initiating the reaction as just described. For example, in my copending application Ser. No. 789,434, entitled "Densified Composite Containing One or More Interwoven Matrix Compositions", filed on even date with this application and assigned to the assignee of this invention, cross-reference to which is hereby made, (hereinafter referred to as my copending "densified composite" application) I have described and claimed methods for densifying the interwoven matrix including in situ densification wherein the powdered initial reactants are uniaxially pressed at a pressure of about 1,000 to 25,000 psi, for example, for about 15 minutes to one hour while the reaction is initiated. This pressure is then continued until the reaction is completed. Care must be exercised, however, in the selection of die materials which will be inert to the reaction taking place within the dies during the formation of the shaped object. It should be further noted here that hot isostatic pressing can also be used in this connection.

In accordance with one embodiment of the present invention, the composite of the invention may comprise more than one of the previously described compositions comprising an interwoven matrix mixture of a refractory hard metal and a metal compound. Such a composite may be formed by physically mixing together two previously formed compositions, each comprising a different interwoven matrix mixture of a refractory hard metal and a metal compound. Preferably, however, the composite is formed, in situ, by mixing together the components which will react to form the compositions which each comprise an interwoven matrix of a refractory hard metal and a metal compound.

One of the advantages of forming the composite by mixing together the components which will react to form the compositions, which each comprise an interwoven matrix of a refractory hard metal and a metal compound, is to use such an in situ formation as a temperature control to control the amount of exothermic heat released as the reaction proceeds to form the interwoven matrix. For example, the reaction between $TiO_2$, $B_2O_3$, and aluminum is very exothermic and releases large quantities of heat, e.g., about $3.6 \times 10^6$ Joules/kilogram. In some instances, the excessive amount of heat released during the exothermic reaction to form an interwoven matrix of, for example, $TiB_2$ and $Al_2O_3$ will result in distortion or warping of the shape of a green ceramic initially formed from a mixture of the reactants prior to the exothermic reaction to form the interwoven matrix. The large increase in temperature may also lead to significant vaporization of some species resulting in poor quality of final product. Elimination of low melting impurities is desirable, however.

In accordance with this first embodiment of the invention, however, if such reactants are mixed, prior to the displacement reaction, with other reactants which also react to form an interwoven matrix, but with release of less exothermic heat, the resultant composite of two or more compositions, each of which comprises an interwoven matrix of a refractory hard metal and a metal compound, may be formed without distortion or warping of the final product.

Thus, for example, if the reactants which will, respectively, form interwoven matrices of $ZrB_2$ and $Al_2O_3$, and $TiB_2$ and $Al_2O_3$ are mixed together in amounts which will form, upon subsequent reaction, ratios in a composite of from 20 wt. % $TiB_2$/80 wt. % $ZrB_2$ to 80 wt. % $TiB_2$/20 wt. % $ZrB_2$, the excessive amount of exothermic heat generated by the reaction to form the $TiB_2$ may be controlled due to the lessor amount of heat liberated by the exothermic reaction to form the $ZrB_2$ interwoven matrix whereby the shape of the resulting composite will not be distorted or warped as might be a product formed using only the $TiB_2$ reactants.

Thus one embodiment of the invention relates to the formation of the composite using reactants to form, in situ, two compositions, each comprising an interwoven matrix of a refractory hard metal and a metal compound.

In accordance with another embodiment of the invention, when only one interwoven matrix composition is used in the composite, the composite may comprise (1) an interwoven matrix of a refractory hard metal and a metal compound and (2) up to 80 wt. % of one or more previously formed refractory hard metal compositions. For example, the composite may be formed from a mixture of previously formed $TiB_2$ and the reactants which will react, via a displacement reaction, to form an interwoven matrix composition of $TiB_2$ and $Al_2O_3$, e.g., $TiO_2$, $B_2O_3$, and metallic Aluminum. The addition of at least 3 wt. %, and preferably 20 wt. %, of previously formed $TiB_2$, for example, to the above reactants has been found to control the amount of exothermic heat liberated in the displacement reaction to an extent which permits formation of the desired or controlled shapes without the undesirable side effects from the generation of excessive exothermic heat.

However, it will be appreciated that the amount of, for example, $TiB_2$, $ZrB_2$, or a combination thereof, which may be added without any detrimental effects may be limited by the amount of exothermic heat needed to sustain propagation of the reaction through the remainder of the formed object if the local initiation methods previously described with respect to my aforementioned copending "local initiation" application Ser. No. 789,435 are used when forming the interwoven matrix composition. If such methods are used to produce the composite of this invention, it can be seen that if too much of the reaction product, e.g., $TiB_2$ or $ZrB_2$, is added, for example, insufficient heat may be exothermically generated to sustain the desired propagation of the reaction throughout the formed object.

Other previously formed refractory hard metals may be added to the reactants instead of $TiB_2$ or $ZrB_2$. Examples of other such refractory hard metals are set forth in a publication entitled "Inert Cathodes and Anodes for Aluminum Electrolysis" by K. Billenhaug and H. A. Oye published by Aluminum Verlag GmbH, Dusseldorf, West Germany, 1981, incorporated herein by reference.

Combinations of reaction products of previous displacement reactions, for example, may also be added to the reactants, as noted herein. For example, reaction products, such as an interwoven matrix of $TiN$-$Al_2O_3$ may be added. Of course, the levels or ratios of $TiN$ (titanium nitride) or $Al_2O_3$ in such reaction product can also be varied depending on the amount of each or both mixed in with the initial reactants, as noted herein with respect to the $TiB_2$-$Al_2O_3$ product. When the first reactant contains titanium, preferred refractory hard metals to be added with the reactants include $TiN$ and $TiC$, as well as $TiB_2$ noted above.

Thus, the invention provides a composite which may be formed using two or more interwoven matrix compositions or one interwoven matrix composition together with up to 80 wt. % of additional materials such as one or more previously formed refractory hard metals which may be used to control the amount of exothermic heat generated in forming the interwoven matrix.

While the invention has been described in terms of preferred embodiments, the claims appended hereto are intended to encompass other embodiments which fall within the spirit of the invention.

What is claimed is:

1. A shaped composite comprising at least two interwoven matrix compositions, formed by mixing together reactants capable of forming at least two interwoven matrix compositions prior to reacting said reactants whereby excessive exothermic heat generated during the reaction by reactants forming one or more of the materials in the two interwoven matrix compositions will be compensated for by other reactants which will liberate a lesser amount of exothermic heat while reacting simultaneously to form another of said materials in said interwoven matrix compositions whereby distortion and warping of said composite by generation of excessive exothermic heat during the reaction to form said interwoven matrix compositions will be inhibited.

2. The composite of claim 1 wherein each of said interwoven matrix compositions comprises a first material and a second material formed by reacting first and second reactants capable of reacting to form said first material and a third reactant capable of oxidizing to form said second material.

3. The composite of claim 2 wherein said first reactant is a metal or a metal compound and said second reactant is a metal or a metal compound.

4. The composite of claim 3 wherein said first reactant is selected from the group consisting of a metal; and oxides, carbides, nitrides, and silicides of metals; said second reactant is a metalloid selected from the group consisting of boron, nitrogen, carbon, silicon, and sulfur; or a compound formed from such a metalloid; and said third reactant is a reductant; whereby said reactants form an interwoven matrix of a refractory hard metal and a metal compound.

5. The composite of claim 4 wherein said third reactant is selected from the group consisting of Al, Mg, Ca, and Ba.

6. A shaped composite comprising (1) an interwoven matrix of a first material and a second material formed by reacting first and second reactants capable of reacting to form said first material and a third reactant capable of oxidizing to form said second material interwoven with said first material; and (2) at least one previously formed refractory hard metal mixed with said reactants prior to said reaction to form said interwoven matrix in an amount sufficient to prevent the exothermic heat liberated during formation of said interwoven matrix from distorting the resultant composite.

7. The shaped composite of claim 6 wherein said first reactant consists essentially of a titanium-bearing compound, said second reactant consists essentially of a boron-containing compound, said first material formed by reacting said first and second reactants together consists essentially of $TiB_2$, said third reactant capable of oxidizing to form said second material comprises aluminum, and said previously formed refractory hard metal, mixed with said reactants prior to reaction to form said first and second materials in an amount sufficient to prevent exothermic heat liberated during formation of said interwoven matrix from distorting the resultant composite, is selected from the class consisting of $TiB_2$ and $ZrB_2$.

8. A shaped composite comprising an in situ formed mixture of a first interwoven matrix composition consisting essentially of $TiB_2$ and $Al_2O_3$ and a second interwoven matrix composition consisting essentially of $ZrB_2$ and $Al_2O_3$ formed by the simultaneous reaction of $TiO_2$, $ZrO_2$, $B_2O_3$, and $Al$ wherein the ratio of $TiB_2$ to $ZrB_2$ in said resulting composite is from 20 wt. % $TiB_2$/80 wt. % $ZrB_2$ to 80 wt. % $TiB_2$/20 wt. % $ZrB_2$ whereby the exothermic heat generated by the reaction to form said $TiB_2$ may be controlled due to the lesser amount of heat liberated by the exothermic reaction to form the $ZrB_2$ interwoven matrix whereby the shape of the composite will not be distorted or warped.

9. A method of forming a shaped composite essentially free of warpage and distortion which comprises:
   (a) forming a mixture of reactants capable of reacting to form more than one interwoven matrix compositions, wherein each of said compositions contains a refractory hard metal in an interwoven matrix with an oxidized reactant and wherein reactants capable of reacting to form a first refractory hard metal while generating large amounts of exothermic heat are mixed with other reactants capable of reacting to form a second refractory hard metal without generating large amounts of exothermic heat in a ratio sufficient to prevent the total exothermic heat generated from being sufficient to warp or distort the shaped composite product of the reaction; and
   (b) reacting said mixture to form said composite having said first and second refractory hard metals therein;

whereby the simultaneous formation of said first and second refractory hard metals from said mixture of reactants reduces the excessive exothermic heat produced during said reaction whereby said shaped composite is formed without warpage or distortion.

10. The method of claim 9 wherein forming said interwoven matrix compositions comprises reacting first and second reactants capable of reacting to form first and second refractory hard metals and a third reactant capable of oxidizing to form a second material, said first and second refractory hard metals being dispersed through said second material in an interwoven matrix.

11. The process of claim 10 including the further step of locally applying, to a selected region of a shaped body formed from said mixture of said reactants, sufficient energy to initiate an exothermic reaction which propagates throughout the remainder of said body to form said composite containing said interwoven matrix composition.

12. The method of claim 10 wherein step of reacting said first and second reactants to form said first and second refractory hard metals comprises forming $TiB_2$ and $ZrB_2$ and said second material with which said refractory hard metals form interwoven matrix compositions comprises $Al_2O_3$.

13. A method of forming a shaped composite essentially free of warpage and distortion which comprises:
 (a) forming a mixture of reactants capable of reacting to form an interwoven matrix compostion containing a refractory hard metal; and from 3 to 20 wt. % of at least one previously formed refractory hard metal; and
 (b) reacting said mixture to form said composite; whereby the presence of said previously formed refractory hard metal in said mixture of reactants reduces the excessive exothermic heat produced during said reaction whereby said shaped composite is formed without warpage or distortion.

14. The method of claim 13 wherein said refractory hard metal in said interwoven marix formed during said reaction consists essentially of $TiB_2$ and previously formed refractory hard metal is selected from the class consisting of $TiB_2$ and $ZrB_2$.

* * * * *